United States Patent
Le Calvez et al.

(10) Patent No.: US 12,021,996 B2
(45) Date of Patent: Jun. 25, 2024

(54) UNIVERSAL BLOCKCHAIN DATA MODEL

(71) Applicant: COIN METRICS INC., Boston, MA (US)

(72) Inventors: Antoine J. M. Le Calvez, Treverec (FR); Lucas A. Nuzzi, New York, NY (US)

(73) Assignee: Coin Metrics Inc., Boston, MA (US)

( * ) Notice: Subject to any disclaimer, the term of this patent is extended or adjusted under 35 U.S.C. 154(b) by 392 days.

(21) Appl. No.: 17/401,442

(22) Filed: Aug. 13, 2021

(65) Prior Publication Data
US 2022/0052853 A1  Feb. 17, 2022

Related U.S. Application Data

(60) Provisional application No. 63/065,345, filed on Aug. 13, 2020.

(51) Int. Cl.
H04L 9/32 (2006.01)
G06F 16/27 (2019.01)
H04L 9/00 (2022.01)

(52) U.S. Cl.
CPC ............ *H04L 9/3236* (2013.01); *G06F 16/27* (2019.01); *H04L 9/3247* (2013.01); *H04L 9/50* (2022.05)

(58) Field of Classification Search
None
See application file for complete search history.

(56) References Cited

U.S. PATENT DOCUMENTS

| | | |
|---|---|---|
| 2007/0083448 A1 | 4/2007 | Prchal et al. |
| 2013/0212455 A1 | 8/2013 | Titera et al. |
| 2015/0371224 A1 | 12/2015 | Lingappa |
| 2017/0323392 A1 | 11/2017 | Kasper et al. |
| 2020/0027169 A1 | 1/2020 | Valencia |

OTHER PUBLICATIONS

U.S. Appl. No. 17/245,161, filed Apr. 30, 2021, Le Calvez et al.
Muroch, "How accountants can help crypto-mining clients." In: accountingtoday.com, Jul. 17, 2019, [online] [retrieved on Oct. 7, 2021 (Oct. 7, 2021)] Retrieved from the Internet <URL: https://www.accountingtoday.com/list/how-accountants-can-help-cryptocurrency-mining-clients>, entire document.
Lefkowitz, "Transaction fees change the culture of bitcoin, study says." In: Cornell Chronicle, Oct. 30, 2019 [online] [retrieved on Oct. 7, 2021 (Oct. 7, 2021)] Retrieved from the Internet < URL: https://news.cornell.edu/stories/2019/10/transaction-fees-change-culture-bitcoin-study-says>, entire document.
International Searching Authority, PCT International Search Report and Written Opinion, International Application No. PCT/US21/45854, dated Nov. 15, 2021, pp. 1-9.

*Primary Examiner* — Syed A Roni
(74) *Attorney, Agent, or Firm* — Hunton Andrews Kurth LLP

(57) ABSTRACT

The present invention is directed to a system and method that normalized the intricacies of each crypto asset blockchain in order to provide a data model where transactions are represented as sets of debit and credit operations applied to accounts. The Universal Blockchain Data Model (UBDM) of the present invention translates various blockchain concepts into double entry bookkeeping concepts by creating two types of accounts: 1) user accounts and 2) virtual accounts such as issuance accounts and fee accounts.

32 Claims, 7 Drawing Sheets

| COINMETRICS | UBDM | 🔍 000000000019d6689c085ae165831e934ff763ae46a2a6c172b3f1b60a8ce26f |

| 🔍 All | 🗂 Blocks | 👁 Addresses | 🔄 Transactions | | 🔽 Filter |

412

12 results

BTC Bitcoin | Block Hash 000000000019d6689c085ae165831e934ff763ae46a2a6c172b3f1b60a8ce26f
Block Hash 000000000019d6689c085ae165831e934ff763ae46a2a6c172b3f1b60a8ce26f   Number of Transactions 3
Consensus Time 2009-01-03T18:15:05.000000000Z

BTC Bitcoin Cash | Block Hash 000000000019d6689c085ae165831e934ff763ae46a2a6c172b3f1b60a8ce26f
Block Hash 000000000019d6689c085ae165831e934ff763ae46a2a6c172b3f1b60a8ce26f   Number of Transactions 3
Consensus Time 2009-01-03T18:15:05.000000000Z

BTC Bitcoin | Block 0
Block Hash 000000000019d6689c085ae165831e934ff763ae46a2a6c172b3f1b60a8ce26f

BTC Bitcoin Cash | Block 0
Block Hash 000000000019d6689c085ae165831e934ff763ae46a2a6c172b3f1b60a8ce26f   Number of Transactions 3
Consensus Time 2009-01-03T18:15:05.000000000Z

BTC Bitcoin | Transaction 4a5e1e4baab89f3a32518a88c31bc87f618f76673e2cc77ab2127b7afdeda33b
Transaction Hash 4a5e1e4baab89f3a32518a88c31bc87f618f76673e2cc77ab2127b7afdeda33b
Block Hash 000000000019d6689c085ae165831e934ff763ae46a2a6c172b3f1b60a8ce26f

BTC Bitcoin Cash | Transaction 4a5e1e4baab89f3a32518a88c31bc87f618f76673e2cc77ab2127b7afdeda33b
Transaction Hash 4a5e1e4baab89f3a32518a88c31bc87f618f76673e2cc77ab2127b7afdeda33b
Block Hash 000000000019d6689c085ae165831e934ff763ae46a2a6c172b3f1b60a8ce26f

BTC Bitcoin | Address 1A1zP1eP5QGefi2DMPTfTL5SLmv7DivfNa
Address 1A1zP1eP5QGefi2DMPTfTL5SLmv7DivfNa
Current Balance 68.37025250 BTC   Creation Time 2009-01-03T18:15:05.000000000Z   Number of Debits 0   Number of Credits 2803

COINMETRICS | UBDM

🔍 00000000000019d6689c085ae165831e934ff763ae46a2a6c172b3f1b60a8ce26f — 410

Blocks | Addresses | Transactions | ▽ Filter

510

4 results

BTC Bitcoin | Block Hash 00000000000019d6689c085ae165831e934ff763ae46a2a6c172b3f1b60a8ce26f
Block Hash 00000000000019d6689c085ae165831e934ff763ae46a2a6c172b3f1b60a8ce26f Number of Transactions 3
Consensus Time 2009-01-03T18:15:05.000000000Z

BTC Bitcoin Cash | Block Hash 00000000000019d6689c085ae165831e934ff763ae46a2a6c172b3f1b60a8ce26f
Block Hash 00000000000019d6689c085ae165831e934ff763ae46a2a6c172b3f1b60a8ce26f Number of Transactions 3
Consensus Time 2009-01-03T18:15:05.000000000Z

BTC Bitcoin | Block 0
Block Hash 00000000000019d6689c085ae165831e934ff763ae46a2a6c172b3f1b60a8ce26f Number of Transactions 3
Consensus Time 2009-01-03T18:15:05.000000000Z

BTC Bitcoin Cash | Block 0
Block Hash 00000000000019d6689c085ae165831e934ff763ae46a2a6c172b3f1b60a8ce26f Number of Transactions 3
Consensus Time 2009-01-03T18:15:05.000000000Z ← Prev   Showing 1-4 out of 4   Next →

Figure 5

| COINMETRICS | UBDM | 🔍 000000000019d6689c085ae165831e934ff763ae46a2a6c172b3f1b60a8ce26f |
|---|---|---|

🔍 All | ⬡ Blocks | ⊙ Addresses | ⇄ Transactions | ▽ Filter

/ 410
/ 610

6 results

BTC Bitcoin | Address 1A1zP1eP5QGefi2DMPTfTL5SLmv7DivfNa
Address 1A1zP1eP5QGefi2DMPTfTL5SLmv7DivfNa
Current Balance 68.37025250   Creation Time 2009-01-03T18:15:05.000000000Z   Number of Debits 0   Number of Credits 2803

BTC Bitcoin | Address 1A1zP1eP5QGefi2DMPTfTL5SLmv7DivfNa
Address 1A1zP1eP5QGefi2DMPTfTL5SLmv7DivfNa
Current Balance 68.37025250   Creation Time 2009-01-03T18:15:05.000000000Z   Number of Debits 0   Number of Credits 2803

BTC Bitcoin | Account FEES
Account FEES
Current Balance 240.5924k BTC   Creation Time 2009-01-03T18:15:05.000000000Z   Number of Debits   Number of Credits

BTC Bitcoin | Account FEES
Account FEES
Current Balance 1736.174 BCH   Creation Time 2009-01-03T18:15:05.000000000Z   Number of Debits   Number of Credits

BTC Bitcoin | Account ISSUANCE
Account ISSUANCE
Current Balance 188.6449M BTC   Creation Time 2009-01-03T18:15:05.000000000Z   Number of Debits   Number of Credits

BTC Bitcoin | Account ISSUANCE
Account ISSUANCE
Current Balance 2.1899M BCH   Creation Time 2009-01-03T18:15:05.000000000Z   Number of Debits   Number of Credits ← Prev   Showing 1-6 out of 6   Next →

Figure 6

UNIVERSAL BLOCKCHAIN DATA MODEL

CROSS-REFERENCE TO RELATED APPLICATIONS

The application claims priority to U.S. Provisional Application 63/065,345, entitled "Universal Blockchain Data Model," filed Aug. 13, 2020, the contents of which are incorporated herein by reference in their entirety.

This application is related to U.S. patent application Ser. No. 17/245,161, entitled "Blockchain Network Risk Management Universal Blockchain Data Model," filed Apr. 30, 2021, which claims priority to U.S. Provisional Application 63/065,347, entitled "Blockchain Network Risk Management Universal Blockchain Data Model," filed Aug. 13, 2020, the contents of which are incorporated herein by reference in their entirety.

FIELD OF THE INVENTION

The present disclosure relates to the field of blockchain technology, and in particular, to blockchain-based data storage, organization, mapping and search functionality.

BACKGROUND

Blockchain technology is an emerging technology in which many computing devices jointly participate in maintaining a distributed database or ledger. The ledgers or databases underpinning these distributed networks are referred to as blockchains. These blockchains are typically append-only and record every transaction that has taken place since inception. These distributed systems have a native crypto asset, which is often algorithmically issued by the network as a reward to the computing devices (known as miners or block producers) that can successfully meet the requirements to append the ledger in a global competition.

Bitcoin is the first successful implementation of a blockchain with its own native crypto currency. It solved a fundamental problem in computer science expressed by Lamport, Shostak and Pease as the Byzantine Generals Problem (BGP), whereby consensus amongst parties that do not trust each other can be continuously reached if certain conditions are met. Bitcoin's Nakamoto Consensus, the solution to the aforementioned problem, and its underlying data structure gave birth to an entire industry as it demonstrated a novel way to issue assets and track settlement.

The core property of these systems is to accurately track balance changes over time. A Bitcoin balance is defined as value received by an address in a past transaction and that has not yet been spent. In light of this intricacy, the structure of Bitcoin's blockchain and its many replicas has been referred to as the Unspent Transaction Output (UTXO) model. The early crypto assets that followed Bitcoin were near-identical copies that also used the UTXO model. However, as the number of crypto assets increased, so did the approaches to structuring blockchains.

Today, there are thousands of crypto assets and many of which follow unique approaches to the implementation of a blockchain data structure. While Bitcoin's UTXO model is still predominant, emerging structures can follow considerably different models. This plurality in blockchain models is a reflection of the industry's infancy, and it has posed considerable challenges for market participants interacting with multiple blockchains.

Accountants, for example, are required to understand and interpret raw data from multiple blockchains that may follow considerably different structures. The lack of standardization in this interpretation function may introduce subjectivity into the accounting process, to the detriment of both transparency and institutionalization of crypto markets.

SUMMARY

According to one embodiment, the invention relates to a system that implements a universal blockchain data model (UBDM). The system comprises: a data interface that communicates with a plurality of data sources through a communication network, the plurality of data sources comprising one or more different protocols; an application programming interface (API) that communicates with a blockchain management system; and a data model server coupled to the data interface and the API and further comprising a computer processor programmed to perform the steps of: for each protocol, identifying a transaction structure and one or more policies on transaction handling; receiving, via the data interface, transaction data from the plurality of data sources each having a protocol; based at least in part on the transaction structure and the one or more policies on transaction handling, parsing the transaction data into a universal data model format wherein the universal data model format comprises a double entry bookkeeping format using sets of debits and credits applied to user accounts associated with one or more network participants and virtual accounts that balance a ledger, a timestamp and a sequencing identifier identifying one or more balance updates; and providing, via an interactive user interface, a search capability based on an address and one or more filters, wherein the search capability is executed on transaction data in the universal data model format.

According to another embodiment, the invention relates to a method that implements a universal blockchain data model (UBDM). The method comprises the steps of: for each protocol, identifying, via a data model server, a transaction structure and one or more policies on transaction handling; receiving, via the data interface, transaction data from a plurality of data sources each having a protocol; based at least in part on the transaction structure and the one or more policies on transaction handling, parsing, via a processor, the transaction data into a universal data model format wherein the universal data model format comprises a double entry bookkeeping format using sets of debits and credits applied to user accounts associated with one or more network participants and virtual accounts that balance a ledger, a timestamp and a sequencing identifier identifying one or more balance updates; and providing, via an interactive user interface, a search capability based on an address and one or more filters, wherein the search capability is executed on transaction data in the universal data model format.

An embodiment of the present invention is directed to a Universal Blockchain Data Model (UBDM) that provides correct sequencing of transactions and a universal underlying format based on double-entry accounting. An embodiment of the present invention is directed to a performant and reliable blockchain search tool that enables users to look up information on transactions, addresses and blocks through a high-performance API. This provides a uniform way to query data regardless of the blockchain by using a double entry bookkeeping format.

An embodiment of the present invention provides a wide coverage universe through an interface for the exploration of dozens and dozens of top crypto assets. The innovative system is highly performant through a scalable design that enables users to search several addresses at once and then return a calculated historical balance of each address. A wide range of querying parameters enables responses to be filtered by account, height, adjusted time, etc. The system provides versatile data delivery through a low latency and high availability HTTP API and user interface. A resilient infrastructure is realized through a data input layer with multiple instances of full node exporters for each asset, a strong focus on redundancy with local and cloud operations distributed around the globe, and enterprise-grade operations supported by regular backups, robust telemetry and comprehensive monitoring. A data delivery layer utilizes multiple instances to ensure reliability and low latency and may be deployed on geo-redundant servers.

These and other advantages will be described more fully in the following detailed description.

BRIEF DESCRIPTION OF THE FIGURES

These and other characteristics of the present invention will be more fully understood by reference to the following detailed description in conjunction with the attached drawings.

FIG. 4 is an exemplary user interface, according to an embodiment of the present invention.

FIG. 5 is an exemplary user interface, according to an embodiment of the present invention.

FIG. 6 is an exemplary user interface, according to an embodiment of the present invention.

DETAILED DESCRIPTION

Figure 1:
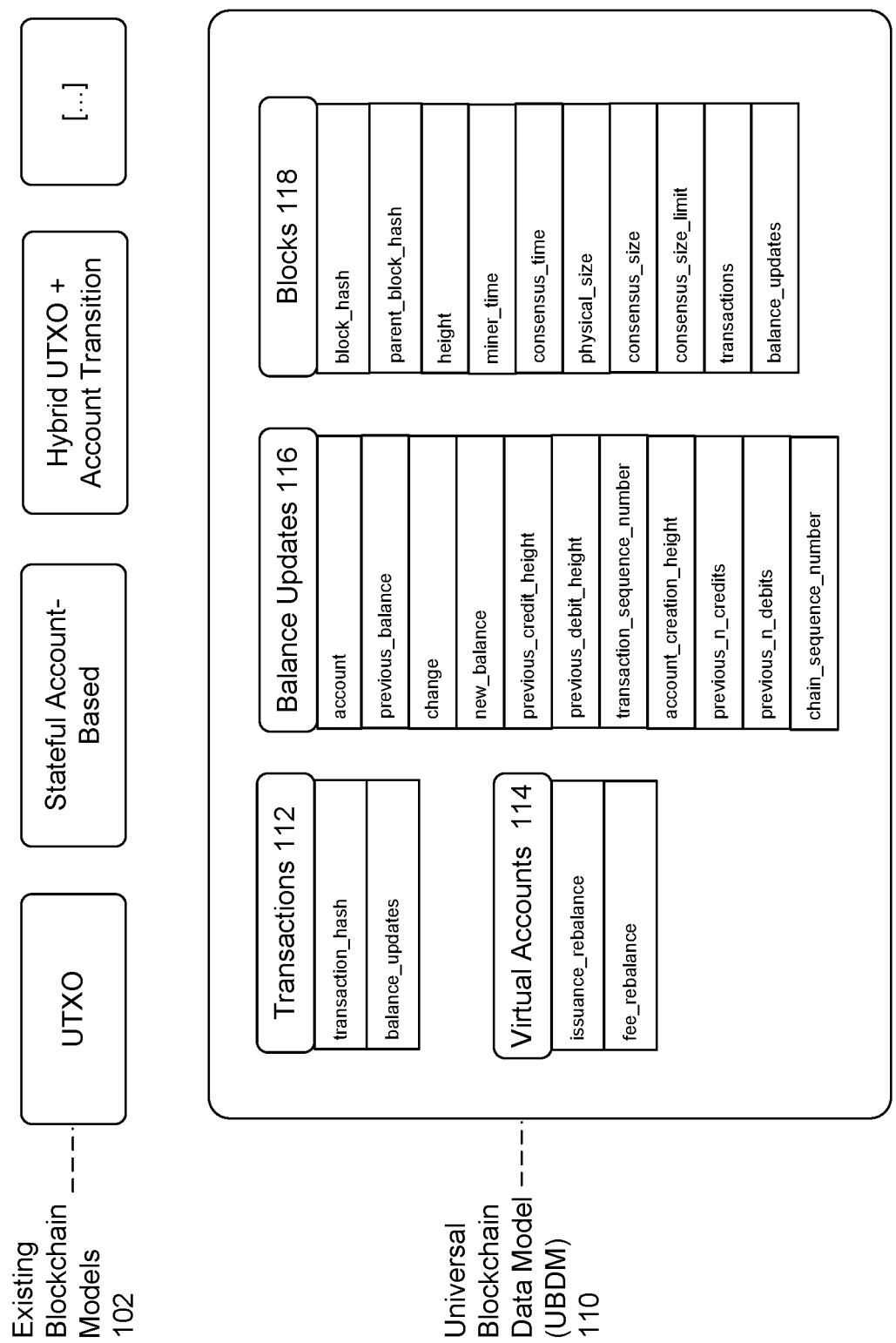
FIG. 1 is an exemplary illustration of a Universal Blockchain Data Model, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to a Universal Blockchain Data Model (UBDM) that restructures transactions from various blockchains. An embodiment of the present invention normalizes the intricacies of each crypto asset blockchain to provide a data model where transactions are represented by sets of debit and credit operations applied to accounts. Crypto assets follow widely different structures to facilitate peer-to-peer transactions. While the general concept of transactions grouped into interconnected blocks (a blockchain) is used across most crypto assets, the underlying data structure and transactional mechanisms vary, as they are defined by a blockchain's underlying protocol. This makes working with multiple blockchains very challenging. To illustrate, transactions in Bitcoin, for example, occur when Unspent Transactions Outputs (UTXOs) are spent, whereas transactions in Ethereum occur when account balances are updated.

To address this, an embodiment of the present invention is directed to normalizing data though a universal blockchain data model, which converts the idiosyncrasies of each blockchain into double-entry bookkeeping. The UBDM makes it easier for users to understand the activity occurring on these networks. The use of this novel data model provides a generalized view of blockchains, where transactions of any crypto asset may be simply expressed as sets of debit and credit operations, ultimately making blockchains more universally searchable. An embodiment of the present invention is directed to translating various blockchain concepts into double entry bookkeeping concepts by creating at least two types of accounts: 1) user accounts and 2) virtual accounts, such as issuance accounts and fee accounts.

An embodiment of the present invention is directed to a blockchain search tool that leverages the UBDM to standardize and simplify raw blockchain data. It provides a uniform way to query data from various blockchain full nodes using the double-entry accounting format, thereby bridging the underlying intricacies of different blockchain data models. An embodiment of the present invention supports various assets including but not limited to Bitcoin, Bitcoin Cash, Binance USD, Dash, Ethereum, Litecoin, Huobi USD, Paxos Standard, Paxos Gold, USDC, USDT Omni, USDT ETH, USDT TRX, WBTC, XRP, Zcash and other variations.

When searching for information on a blockchain (e.g., an address, a transaction, etc.), there are millions of ledger entries to comb through. This is because blockchains are typically append-only and record every transaction that has taken place since inception. An embodiment of the present invention is directed to a search tool designed to organize this information to provide accurate and valuable results related to a query.

With hundreds of crypto assets, each with an ever growing ledger, an embodiment of the present invention organizes blockchain data so that it can be accessed more efficiently. According to an exemplary illustration, an embodiment of the present invention runs over 100 blockchain full nodes.

An embodiment of the present invention is directed to finding the result of a query nearly instantaneously by knowing exactly where to look in the efficiently organized data model. Knowing which blockchain a user is searching and what type of result the user is looking for helps to quickly pinpoint the answer.

An embodiment of the present invention is directed to providing flexibility, user-friendliness, and performance. A user may explore a variety of blockchains using a single interface. The system supports searches and requests relating to the full transaction history for hundreds of addresses, the specific balance of an address at a point-in-time and/or all transactions in a particular block. In addition, the system may filter responses along many useful dimensions. And, the system may normalize dates using corrected transaction timestamps, which are particularly useful when evaluating blocks where miners erroneously reported the timestamp.

Accounts in the UBDM may include User Accounts, which are addresses that belong to network participants, and Virtual Accounts, which are accounts used to balance the ledger. Consistent with double entry bookkeeping and balance sheet equation (assets=liabilities+equity), the UBDM uses virtual accounts to balance the ledger and denote new asset issuance, inflation, fees, etc. Instead of representing user balances, these accounts serve to balance transactions and blocks so that all network transactions and blocks are balanced.

The various types of virtual accounts depend on the structure supporting each asset. For example, Bitcoin and similar UTXO-based assets carry two types of virtual accounts: issuance accounts and fee accounts. Other virtual accounts may be supported.

FIG. 1 is an exemplary illustration of a Universal Blockchain Data Model, according to an embodiment of the present invention. Existing Blockchain Models 102 are shown as UTXO, Stateful Account-Based, Hybrid UTXO and Account Transition. UBDM 110 may include Transaction 112, Virtual Accounts 114, Balance Updates 116 and Blocks 118.

Virtual Accounts 114 may be used to balance transactions and blocks consistent with double entry bookkeeping. Virtual Accounts may include an Issuance Account. Some protocols (e.g., Bitcoin) subsidize network security for a limited time by issuing new assets to successful miners in so-called coinbase transactions. Since new units sent to miners create an imbalance in the ledger, a virtual issuance account may be debited with every new transaction (e.g., coinbase transaction). There have been instances where, due to miner error, part of the funds that would have otherwise been fully claimed by a miner are inadvertently locked and irredeemable. In such circumstances, the issuance account may be credited when units are permanently locked in, or burned.

In addition, Virtual Accounts 114 may include a Fee Account. Some transactions (e.g., Bitcoin) may include inputs and outputs. For example, users may pay fees to miners to include their transactions in a block, but that fee is not showcased in the transaction's output list. As a result, there is an imbalance between inputs and outputs (e.g., the difference represented as miner fees), which may be settled when a block containing the transaction is mined. To account for this imbalance, a virtual Fee Account may be credited when users pay fees and debited when miners claim these fees by mining a block.

An embodiment of the present invention addresses non-transactional credits and/or debits. While the majority of debits and credits take place within a transaction, some protocols may have balance updates that occur outside of transactions. For example, Ethereum blocks rewards may be credited implicitly, outside of any transaction. In other circumstances, a block may carry additional credits and debits so that the ledger may be accurately balanced. For example, an irregular ledger update following an event, such as a hack or attack, may lead to appending additional credits and debits to that block in order to account for the irregular ledger change.

The UBDM employs the universal concept of blocks, as represented by Blocks 118, which may include the following exemplary fields:

| Field | Description |
| --- | --- |
| block_hash | Hash of that block, unique per block |
| parent_block_hash | Hash of the parent of that block (e.g., set to a string of 64 zeros for genesis blocks) |
| height | Height of that block |
| miner_time | Miner/Producer timestamp |
| physical_size | The physical size of a block in bytes |
| consensus_size | The stripped size of a block with Segregated Witness (signature) data |
| consensus_ size_ | The size limit of a block in weight units, |

-continued

| Field | Description |
| --- | --- |
| limit | a measurement system implemented after the adoption of Segregated Witness transactions. |
| consensus_time | Consensus timestamp. Increases monotonically. |
| transactions | List of transactions inside that block |
| balance_updates | List of non-transaction balance updates for that block |

Transactions that use segregated witnesses may be referred to as segwit transactions. For these transactions, calculating the number of weight units in a transaction is more complicated. For example, the transaction may be put into a format used by a P2P protocol block message (segwit-enabled). Each byte of the segwit marker, flag, and witness fields may count as one weight unit. Each byte of the other fields in the transaction may count as four weight units.

For example, the segwit equivalent to the P2PKH transaction analyzed in the legacy section above would be a transaction with one input (using P2WPKH) and two P2WPKH outputs, or about 222 bytes.

According to an embodiment of the present invention, the UBDM accounts for different types of timestamps, such as miner-reported and consensus.

The miner timestamp may represent the timestamp put in the block header by the miner. For example, UTXO-based chains do not guarantee that the miner timestamps are accurate or even have to follow the same order as the height. A timestamp for Bitcoin may be considered valid if it is greater than the median timestamp of the previous 11 blocks, and less than the network adjusted time+2 hours (network adjusted time is the median of the timestamps returned by all nodes connected to the miner). As a result, block 1 could have a timestamp younger than block 2, which complicates any analysis that requires the correct ordering of transactions.

In order to provide accurate ordering, an embodiment of the present invention may apply a Consensus Timestamp, which has the property of providing the same or partial order over blocks than the height does (e.g., a block's consensus Timestamp is always greater or equal to that of its parent). This provides a uniform time series that accurately reflects the ordering of transactions.

Transactions modeling UBDM transactions, consistent with double entry accounting transactions, may include groups of balance updates that are ordered within a block. Transactions, represented by 112, may include the following exemplary fields:

| Field | Description |
| --- | --- |
| transaction_hash | Hash of that transaction |
| balance_updates | Balance updates resulting from this transaction |

Balance Updates 116 may represent a change in balance of an account. If the change is greater-or-equal-to 0, it is considered a credit. Otherwise, it is considered a debit. In certain circumstances, there may be 0-valued balance updates. This may be used to represent 0 fees transactions, for example, which were frequent in Bitcoin's early history.

Within the UBDM, each balance update, represented by 116, may include the following exemplary fields:

| Field | Description |
| --- | --- |
| account | Which account's balance changed |
| previous_balance | What was its balance prior to the application of this update |
| change | What is the change of its balance (e.g., a positive or negative amount) |
| new_balance | What is the balance of this account after the application of this update |
| previous_credit_height | What was the height of the last credit from this account (null if no prior credit) |
| previous_debit_height | What was the height of the last debit from this account (null if no prior debit) |
| transaction_sequence_number | Orders this update inside the transaction that contains it |
| account_creation_height | At what height was the account created |
| previous_n_credits | How many times has this account been credited prior to this update |
| previous_n_debits | How many times has this account been debited prior to this update |
| chain_sequence_number | The global ordering of this update relative to all other updates recorded on the ledger up until that point |

An embodiment of the present invention is directed to applying Transaction Sequencing to balance update sequencing with a transaction sequence identifier. For example, a tx_sequence_number field may order and match sets of credits and debits inside a transaction. If in a single transaction, Alice sent Bob 1 token and then Bob sent Charlie 1 token, the following order of events would apply:

transaction_sequence_number=0: Alice debited by 1 token, Bob credited by 1 token.

transaction_sequence_number=1: Bob debited by 1 token, Charlie credited by 1 token.

Beyond ordering, transaction sequence numbers may be used to apply the concepts of sender and receiver because within the same transaction sequence number, senders are the accounts that were debited whereas receivers are the accounts that were credited.

In addition, credits and debits inside a transaction may be grouped by transaction sequence number (tx_sequence_number) in ascending order and applied to each transaction atomically to reflect the order in which credits and debits occurred in the asset.

An embodiment of the present invention is directed to applying Chain Sequencing. For example, a global sequence number may denote the ordering of a transaction's updates relative to other balance updates that have taken place up until that point. For example, a first credit to the miner of the genesis block (e.g., first block to be confirmed in the ledger) for the chain has a chain_sequence_number of 0. The operations in the transactions immediately after that, be it a credit or a debit, would have the chain_sequence_number of 1. In many ways, this is analogous to block height (for block ordering), but the UBDM takes this concept further and applies ordering to all operations that have ever taken place.

According to an embodiment of the present invention, the chain_sequence_number represents a convenient way to record the order of events in the ledger, where the ordering may be subject to revision and change under certain circumstances.

An embodiment of the present invention may be applied to UTXO transactions. UTXO transactions (used in Bitcoin and derivative assets) may include two parts: (1) inputs (debits) which list the previously unspent outputs spent by this transaction; and (2) outputs (credits) which list the newly created unspent outputs by this transaction.

Because UTXO transactions may be applied atomically, all credits and debits have tx_sequence_number=0.

An exemplary transaction may involve paying a fee of 0.26 BTC as shown below:

| Inputs | Outputs |
| --- | --- |
| 50 BTC from 1NA7M . . . | 105 BTC to 1P3CK . . . |
| 50 BTC from 1J27C . . . | 44.74 BTC to 1NA7Mop . . . |
| 50 BTC from 1DJ8d . . . | |

In the above, because fees are not paid with UTXOs, the field is blank to show this transaction as a 3 input to 2 output transaction.

Under the UBDM, this exemplary transaction may be represented in the following representative JSON format:

```
{
"transaction_hash":
"418b84d7649055411d8be4e241376a93825c1d6248a304ae693060b3007a43f2",
"balance_updates": [{
  "change": "-50.00000000",
  "account": "1NA7Mopi9b4YhuWSBrB7D4W5XsTY53N1zY",
  "new_balance": "0.00000000",
  "previous_balance": "50.00000000",
  "previous_n_debits": "0",
  "previous_n_credits": "1",
  "transaction_sequence_number": "0",
  "chain_sequence_number": "156700",
  "previous_credit_height": "35892",
  "account_creation_height": "35892"
},
{
  "change": "-50.00000000",
  "account": "1J27CLhDGmm3qBSiVcGxoE3evoSECUREYj",
  "new_balance": "0.00000000",
  "previous_balance": "50.00000000",
  "previous_n_debits": "0",
  "previous_n_credits": "1",
  "transaction_sequence_number": "0",
  "chain_sequence_number": "156701",
  "previous_credit_height": "13316",
  "account_creation_height": "13316"
},
{
  "change": "-50.00000000",
  "account": "1DJ8d8gVU5VFGpSjr2AzwS9Jtg5YnyfWQD",
  "new_balance": "0.00000000",
  "previous_balance": "50.00000000",
  "previous_n_debits": "0",
  "previous_n_credits": "1",
  "transaction_sequence_number": "0",
  "chain_sequence_number": "156702",
  "previous_credit_height": "24451",
  "account_creation_height": "24451"
},
{
  "change": "105.00000000",
  "account": "1P3CKNyDEMRKHTDTLPqesYKSzPCo1QUCQK",
  "new_balance": "555.00000000",
  "previous_balance": "450.00000000",
  "previous_n_debits": "1",
  "previous_n_credits": "2",
  "transaction_sequence_number": "0",
  "previous_debit_height": "48243",
  "chain_sequence_number": "156703",
  "previous_credit_height": "47494",
  "account_creation_height": "47041"
},
{
  "change": "44.74000000",
  "account": "1NA7Mopi9b4YhuWSBrB7D4W5XsTY53N1zY",
  "new_balance": "44.74000000",
```

-continued

```
    "previous_balance": "0.00000000",
    "previous_n_debits": "1",
    "previous_n_credits": "1",
    "transaction_sequence_number": "0",
    "previous_debit_height": "48890",
    "chain_sequence_number": "156704",
    "previous_credit_height": "35892",
    "account_creation_height": "35892"
  },
  {
    "change": "0.26000000",
    "account": "FEES",
    "new_balance": "0.00000000",
    "previous_balance": "-0.26000000",
    "previous_n_debits": "11",
    "previous_n_credits": "49523",
    "transaction_sequence_number": "0",
    "previous_debit_height": "48890",
    "chain_sequence_number": "156705",
    "previous_credit_height": "48889",
    "account_creation_height": "0"
  }
 ]
}
```

One of skill in the art will appreciate that this transaction example and output are merely one exemplary illustration for implementing the concepts and functionality of the present invention, and the embodiments of the present invention are therefore not limited to this specific output.

Figure 2:
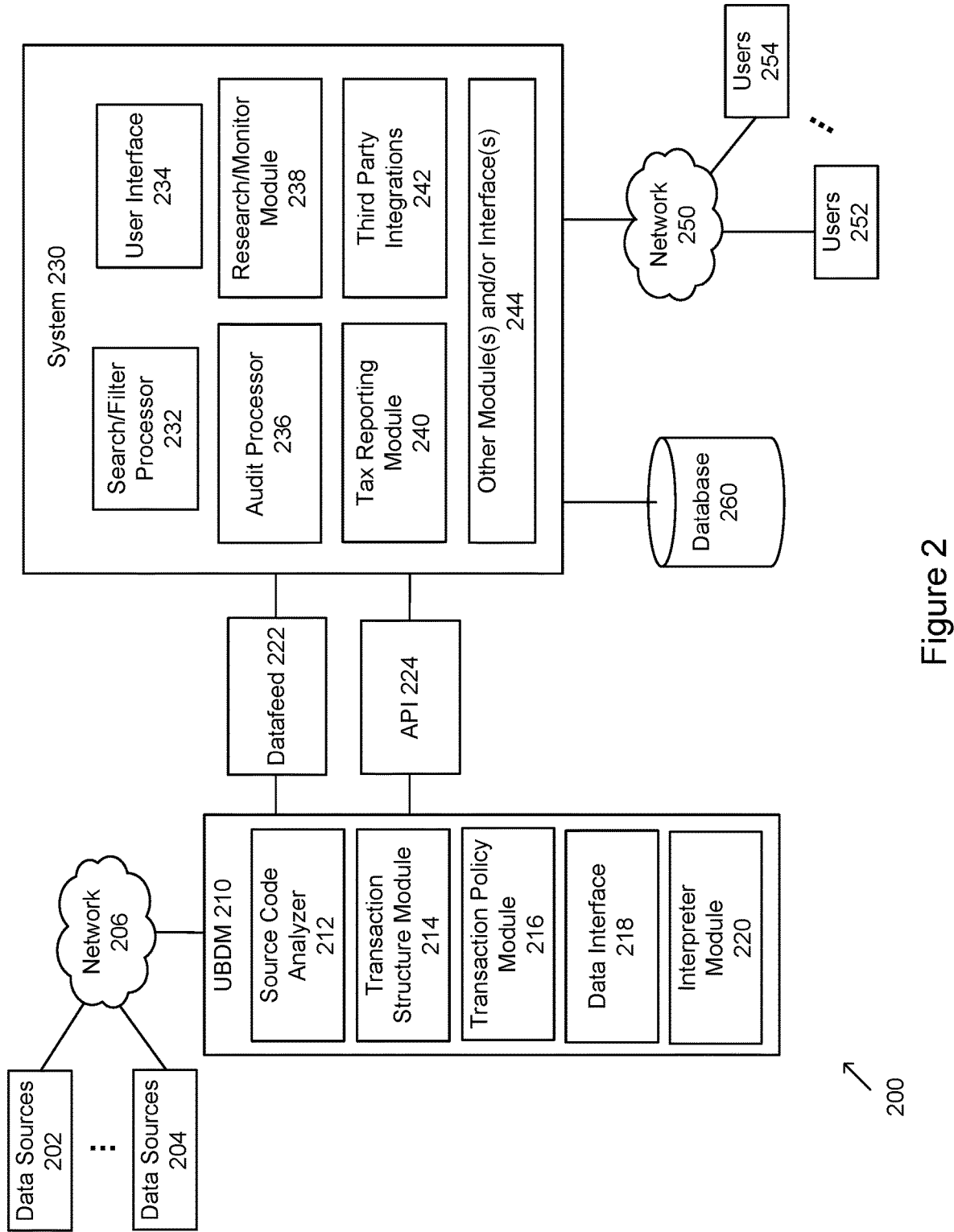
FIG. 2 is an exemplary system diagram, according to an embodiment of the present invention.

FIG. 2 is an exemplary system diagram, according to an embodiment of the present invention. According to an exemplary illustration, System 230 represents a server or processor that executes a service that generates risk analytics and metrics. System 230 provides a comprehensive approach to blockchain network risk management. It further enables users to identify network attacks, double spends, blockchain splits, market abnormalities, etc.

System 230 may receive data from multiple data sources, apply data formatting, perform risk analysis and generate alerts relating to network risks, settlement risks, fee volatility events and unusual network activity risks. Data sources may include relay protocols, full node clients, mining pool protocols and marketplaces. These representative sources provide a comprehensive view on processed and unprocessed transactions from which alerts may be created. Data may be formatted, collected and verified for risk analysis and determination.

As shown in FIG. 2, data sources 202, 204 may represent various nodes of crypto networks. For example, nodes may include Relay Protocols and Full Node Clients. An exemplary Relay Protocol may include FIBRE (Fast Internet Bitcoin Relay Engine) and other protocol or implementation designed to relay blocks within a network of nodes. Full Node Clients may represent a node that fully validates transactions and blocks. Other nodes may include Mining Pool Protocols and Hashrate Rental Marketplaces as well as other nodes and/or blockchain data sources.

Raw data on processed transactions across various supported networks may be provisioned via Universal Blockchain Data Model (UBDM) 210 and accompanying Datafeed 222 and/or API 224. By implementing UBDM 210, specific addresses may be monitored.

As shown in FIG. 2, data from sources may be received and translated into a format via UBDM 210 which is then received by Datafeed 222 and API 224. UBDM provides correct sequencing of transactions and a universal underlying format. Moreover, intricacies of each blockchain may be represented as a data model where transactions are structured as sets of debits and credits applied to accounts. According to an embodiment of the present invention, UBDM translates various blockchain concepts into double entry bookkeeping concepts by creating user accounts and virtual accounts, such as issuance accounts and fee accounts.

UBDM 210 may include Source Code Analyzer 212, Transaction Structure Module 214, Transaction Policy Module 216, Data Interface 218 and Interpreter Module 220. Source Code Analyzer 212 may perform an analysis of a protocol's source code. Transaction Structure Module 214 may determine how transactions are structured for a particular protocol. Transaction Policy Module 216 may identify any policies on transaction handling that are intrinsic to the protocol. Data Interface 218 may export data from a data source or node via Remote Procedure Calls (RPCs) native to the full client, or by directly sourcing its raw format on disk. Other data transmission mechanisms may be applied. Interpreter Module 220 may identify the protocol's idiosyncrasies and parse data into a universal format represented by the UBDM.

Datafeed 222 provides insightful, aggregate network data metrics for crypto assets. For example, Datafeed 222 may aggregate on-chain data for analysis and trading. Datafeed 222 may support multiple feeds, including Daily Macro (end of day) and Block-by-Block (real-time). Datafeed 222 may support on-chain datasets for analyzing crypto assets.

API 224 provides access to UBDM 210. For example, API 224 provides a uniform way to query data from various blockchain full nodes using double entry bookkeeping format, e.g., UBDM. In addition, API 224 may enable a blockchain search engine to look up information on transactions, addresses and/or blocks. API 224 may represent a universal blockchain explorer or other API that provisions data that has been converted to the Universal Blockchain Data Model (UBDM) 210. In certain blockchains, API 224 may provision data sourced directly from the blockchain via Remote Procedure Call or sourced through On Disk Data Retrieval.

According to an embodiment of the present invention, API endpoints may be located under the common/blockchain prefix. There are four exemplary data sets returned by the API endpoints:

Accounts/blockchain/{asset}/accounts;
Blocks/blockchain/{asset}/blocks;
Transactions/blockchain/{asset}/transactions;
Balance Updates/blockchain/{asset}/balance-updates.

These endpoints (with no additional query parameters) may return a full list of accounts, blocks, transactions, or balance updates for the asset queried with fields listed in each relevant section that follows. The result may also be filtered for specific accounts or transactions, or for specific start/end times, heights, and chain sequence numbers.

An embodiment of the present invention enables the filtering of specific accounts and/or transactions based on size in native units (and by extension USD and other units). Additionally, other embodiments may include additional metadata as it becomes more commonly included (e.g., via OP_RETURN or via a different mechanism). The return may then be filtered by this metadata as well. Moreover, additional embodiments of the data model may include specs from second layer smart contracts, and therefore represent another filtering mechanism. Other filtering metrics and/or parameters may be applied.

Accordingly, if a user wants a list of balance updates for a specific set of Bitcoin accounts, the user may use the/blockchain/btc/balance-updates endpoint with the accounts=parameter.

There are also two exemplary full entity endpoints that may be used:

Single full Block with all Transactions/blockchain/{asset}/blocks/block_hash;

Single full Transaction with all Balance Updates /blockchain/{asset}/transactions/transaction_hash.

These endpoints do not support any query parameters and may return full block information and full transaction information. In this exemplary illustration, the objects returned are the same as those without the full prefix with additional JSON fields.

Exemplary illustrative queries may be represented as follows:

Account information for all accounts created in the blockchain: /{asset}/accounts;

Account information for only specified accounts: /{asset}/accounts?accounts=account1, account2;

Block information for all blocks created in the blockchain: /{asset}/blocks.

FIG. 2 is an exemplary system diagram that provides blockchain network risk management, according to an embodiment of the present invention. System 230 may receive data from various data sources represented by 202, 204 via Network 206. Data may represent transaction data. The received data may be formatted and transformed through a data model represented by UBDM 210 which communicates through Datafeed 222 and/or API 224.

As shown in FIG. 2, UBDM 210 may be interfaced via different methods. For example, it may be queried via API 224, which serves data in JSON format. Additional interfaces such as Graphical User Interfaces (GUIs) represented by User Interface 234 may be implemented to provide search functions for specific blocks, transactions, sequence IDs, balance updates, addresses, or any message, such as strings encoded in OP_RETUN scripts.

System 230 may include Search/Filter Processor 232 and User Interface 234 that provides alerts and supporting analytics to various recipients represented by Users 252, 254 through Network 250.

According to an exemplary illustration, UBDM 210 may be used as the backbone of a Universal Blockchain Explorer (represented by Search/Filter Processor 232) that provides raw transactional data from various networks. Users 252, 254 of multiple crypto assets that transact without full copies of multiple ledgers (e.g., full nodes) may use light clients to transact and source complete information on concurrent transaction settlement from multiple networks through a single source.

In addition, System 230 may include processors and/or other components that support risk management functionality represented by Audit Processor 236, Research Module 238, Tax Reporting Module 240 and Third Party Integrations 242. Other risk management functionality may be represented by Other Risk Alert Module(s) and/or Interface(s) 244.

Audit Processor 236 enables a search to audit transactions or verify account balances at any point in time. Research/Monitor Module 238 may measure the flow of funds between addresses, understand address interrelationships and calculate on-chain metrics. Tax Reporting Module 240 may combine results from the API with reference rates to determine a tax basis for tax reporting. Third Party Integrations 242 may integrate the API into applications to enable users to look-up addresses, transaction information and/or other data.

The UBDM of an embodiment of the present invention provides the basis for on-chain metric calculations by providing a uniform data structure to which a single methodology may be applied. Generally, applying specific methodologies onto the various blockchain data structures entail a level of subjectivity. For example, a metric methodology applied to UTXO-based chains may involve adjustments if applied to an account-based chain. As a result, some metrics derived from differently structured networks may not be fully comparable. However, applying methodologies to derived UBDM data, according to an embodiment of the present invention, preserves full comparability.

Given that the majority of crypto asset market participants offer services and markets for a plethora of different crypto assets, the UBDM of an embodiment of the present invention may further manage crypto asset inventories and collateral across networks. For example, auditors may use the schema to facilitate the attestation or provisioning of cryptographic proofs of reserves via Audit Processor 236.

Beyond settlement monitoring, the UBDM may also be used to monitor the health of crypto asset networks more broadly and effectively via Research/Monitor Module 238. Differently structured networks face idiosyncratic risks. Proof of Work networks, for example, where final settlement times are subjective, face events that may deem sets of transactions invalid. In such cases, a monitoring tool or module (represented by Research/Monitor Module 238) powered by the UBDM may provide a single source of information on transactions that may have been impacted.

User Interface 234 may represent an interface (such as a GUI) that enables a user to interact with System 230. A user may receive alerts and other information from System 230 through a mobile device, computer system and other device with a computer processor. User Interface 234 may include any hardware, software, or combination of hardware and software used by a processor that allows a user to interact with the processor of the communication device. A user interface may be in the form of a dialogue screen provided by an application, for example. A user interface may also include any of touch screen, keyboard, voice reader, voice recognizer, dialogue screen, menu box, list, checkbox, toggle switch, a pushbutton, a virtual environment (e.g., Virtual Machine (VM), cloud, etc.), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Networks 206 and 250 may represent a wireless network, a wired network or any combination of wireless network and wired network. Networks 206 and 250 may utilize one or more protocols of one or more network elements to which it is communicatively coupled. Networks 206 and 250 may translate to or from other protocols to one or more protocols of network devices. Although Networks 206 and 250 are depicted as one network for simplicity, it should be appreciated that according to one or more embodiments, Networks 206 and 250 may comprise a plurality of interconnected networks, such as, for example, a service provider network, the Internet, a cellular network, corporate networks, or even home networks, or any type of network.

The various modules provide a holist and customizable way to monitor network risk. These modules are exemplary and illustrative, System 230 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, System 230 may implement various subsets of modules in numerous combinations to support uses cases, applications and environments as needed. Other architectures may be realized.

The system 200 of FIG. 2 may be implemented in a variety of ways. Architecture within the system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 is depicted, it should be appreciated that other connections and relationships are possible. The system 200 described below may be used to implement the various methods herein, by way of example. Various elements of the system 200 may be referenced in explaining the exemplary methods described herein.

Data may be stored and managed at Database 260. Database 260 may represent one or more storage components that includes any suitable data structure to maintain the information and allow access and retrieval of the information. The storage may be local, remote, or a combination. The storage components may also represent cloud or other network based storage. Communications with the storage components may be over a network or communications may involve a direct connection between the various storage components and System 230, as depicted in FIG. 2.

The various embodiments of the present invention improves operations through precise fee estimation and optimal transaction timing. Additional insights may be provided through settlement management and monitoring. An embodiment of the present invention improves network risk management through alerts including hidden inflation and double spend alerts. Additional benefits may be realized through network uptime and vulnerability monitoring. Cybersecurity situation awareness and response may be enhanced through real-time breach detection, breach response via replace by fee or other on-chain mechanism and integration with security workflows.

Figure 3:
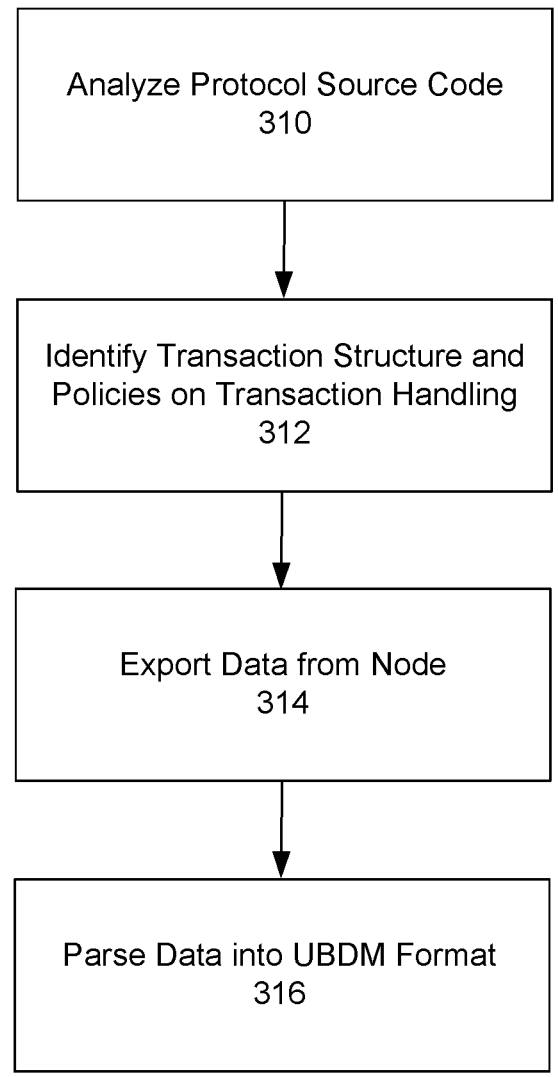
FIG. 3 is an exemplary flowchart, according to an embodiment of the present invention.

FIG. 3 is an exemplary flowchart of UBDM blockchain node translation, according to an embodiment of the present invention. The process of interpreting a blockchain's node data and translating it into the UBDM format requires three distinct processes. At step 310, an analysis of a protocol's source code is performed. At step 312, an understanding of how transactions are structured and any policies on transaction handling that are intrinsic to the protocol may be obtained. At step 314, data is exported from the node via Remote Procedure Calls (RPCs) native to the full client, or by directly sourcing its raw format on disk. At step 316, an interpreter module is written to handle the protocol's idiosyncrasies and to parse data into the UBDM format.

FIG. 4 is an exemplary user interface, according to an embodiment of the present invention. A user input may be provided at 410. The user input may represent an address, code, identifier, etc. Results may be provided as shown by 412. Details may include block hash, consensus time, number of transactions, transaction hash, current balance, creation time, number of debits, number of credits, etc.

FIG. 5 is an exemplary user interface, according to an embodiment of the present invention. FIG. 5 illustrates results filtered by Blocks 510. Details may include block hash, consensus time and number of transactions.

FIG. 6 is an exemplary user interface, according to an embodiment of the present invention. FIG. 6 illustrates results filtered by Addresses 610. Details may include address, account type, current balance, creation time, number of debits, number of credits, etc.

Figure 7:
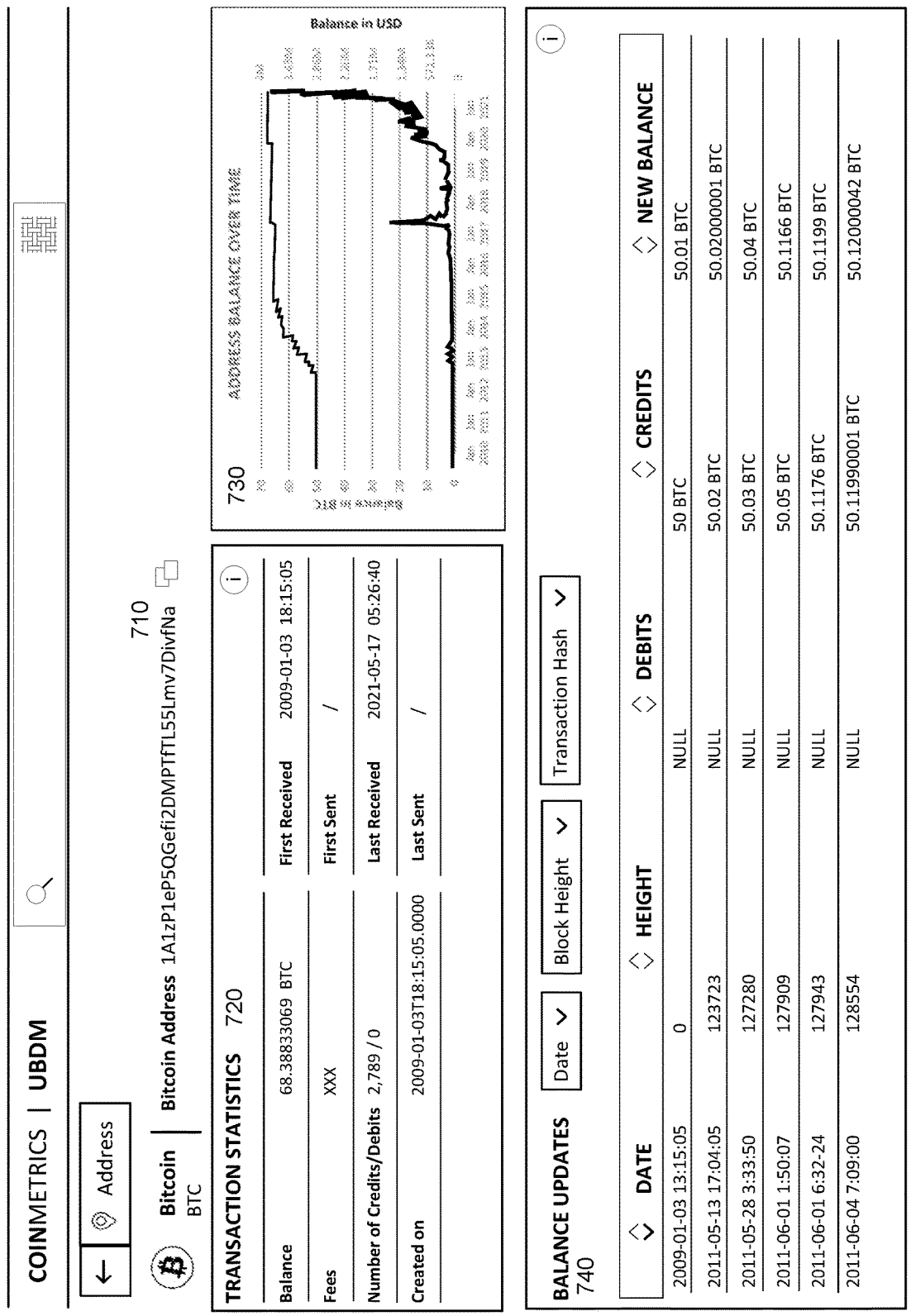
FIG. 7 is an exemplary user interface, according to an embodiment of the present invention.

FIG. 7 is an exemplary user interface, according to an embodiment of the present invention. FIG. 7 illustrates transaction and balance details for a specific address identified at 710. Transaction Statistics 720 may provide data relating to Balance, Fees, Number of Credits/Debits, Created On date/time, First Received, First Sent, Last Received and Last Sent. Graphic 730 illustrates address balance over time. Balance Updates 740 provides balance details by date, height, debits, credits and new balance. Other metrics maybe provided. Balance updates may be further filtered by Date, Block Height, Transaction Hash and/or other parameters.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

The system described above can be implemented with servers and other computing devices in various configurations. The various servers and computing devices may use software to execute programs to execute the methods described above. Various embodiments of the invention also relate to the software or computer readable medium containing program instructions for executing the above described methods.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

The software, hardware and services described herein may be provided utilizing one or more cloud service models, such as Software-as-a-Service (SaaS), Platform-as-a-Service (PaaS), and Infrastructure-as-a-Service (IaaS), on premise deployments and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

It is also to be understood that the following claims are to cover all generic and specific features of the invention described herein, and all statements of the scope of the invention which, as a matter of language, might be said to fall there between.

What is claimed is:

1. A system for implementing a universal blockchain data model (UBDM), the system comprising:
   a data interface that communicates with a plurality of blockchain data sources through a communication network, the plurality of blockchain data sources comprising one or more different blockchain protocols;
   an application programming interface (API) that communicates with a blockchain management system; and
   a data model server coupled to the data interface and the API and further comprising a computer processor programmed to perform the steps of:
     for each blockchain protocol, identifying a transaction structure and one or more policies on transaction handling;
     receiving, via the data interface, transaction data from the plurality of blockchain data sources each having a protocol;
     based at least in part on the transaction structure and the one or more policies on transaction handling, parsing the transaction data into a universal data model format wherein the universal data model format comprises a double entry bookkeeping format using sets of debits and credits applied to user accounts associated with one or more network participants and virtual accounts that balance a ledger, a timestamp and a sequencing identifier identifying one or more balance updates; and providing, via an interactive user interface, a search capability based on an address and one or more filters, wherein the search capability is executed on transaction data in the universal data model format.

2. The system of claim 1, wherein the virtual accounts comprise issuance accounts that are credited when permanently locked in or burned.

3. The system of claim 1, wherein the virtual accounts comprise fee accounts that are credited when fees are paid and debited when miners claim fees by mining a block.

4. The system of claim 1, wherein the timestamp comprises a consensus timestamp that provides a time series that reflects an ordering of transactions.

5. The system of claim 1, wherein the timestamp comprises a miner timestamp that represents a timestamp placed on a block header by a miner.

6. The system of claim 1, wherein the sequencing identifier represents transaction sequencing.

7. The system of claim 1, wherein the sequencing identifier represents chain sequencing.

8. The system of claim 1, wherein the interactive user interface displays for an address a corresponding set of data comprising transaction statistics, an address balance over time graphic and balance updates.

9. The system of claim 1, wherein the one or more filters comprises blocks, addresses and transactions.

10. The system of claim 1, wherein the transaction data relate to unspent transaction output (UTXO) transactions wherein UTXO transactions comprise: (1) inputs that list previously unspent outputs spent and (2) outputs that list newly created unspent outputs.

11. The system of claim 1, wherein the user accounts have corresponding account details comprising one or more financial operations.

12. The system of claim 1, wherein the universal data model format supports a plurality of fields comprising balance update details and balance update count details.

13. The system of claim 1, wherein the universal data model format supports a plurality of fields comprising transaction specific metadata.

14. The system of claim 1, wherein the one or more filters is based at least in part on metadata.

15. The system of claim 1, wherein the interactive user interface displays transactions statistics and balance update details.

16. The system of claim 15, wherein the balance update details comprise date, block height and transaction hash.

17. A method for implementing a universal blockchain data model (UBDM), the method comprising the steps of:

for each of one or more blockchain protocols, identifying, via a data model server, a transaction structure and one or more policies on transaction handling;

receiving, via a data interface, transaction data from a plurality of blockchain data sources each having a protocol;

based at least in part on the transaction structure and the one or more policies on transaction handling, parsing, via a processor, the transaction data into a universal data model format wherein the universal data model format comprises a double entry bookkeeping format using sets of debits and credits applied to user accounts associated with one or more network participants and virtual accounts that balance a ledger, a timestamp and a sequencing identifier identifying one or more balance updates; and providing, via an interactive user interface, a search capability based on an address and one or more filters, wherein the search capability is executed on transaction data in the universal data model format.

18. The method of claim 17, wherein the virtual accounts comprise issuance accounts that are credited when permanently locked in or burned.

19. The method of claim 17, wherein the virtual accounts comprise fee accounts that are credited when fees are paid and debited when miners claim fees by mining a block.

20. The method of claim 17, wherein the timestamp comprises a consensus timestamp that provides a time series that reflects an ordering of transactions.

21. The method of claim 17, wherein the timestamp comprises a miner timestamp that represents a timestamp placed on a block header by a miner.

22. The method of claim 17, wherein the sequencing identifier represents transaction sequencing.

23. The method of claim 17, wherein the sequencing identifier represents chain sequencing.

24. The method of claim 17, wherein the interactive user interface displays for an address a corresponding set of data comprising transaction statistics, an address balance over time graphic and balance updates.

25. The method of claim 17, wherein the one or more filters comprises blocks, addresses and transactions.

26. The method of claim 17, wherein the transaction data relate to unspent transaction output (UTXO) transactions wherein UTXO transactions comprise: (1) inputs that list previously unspent outputs spent and (2) outputs that list newly created unspent outputs.

27. The method of claim 17, wherein the user accounts have corresponding account details comprising one or more financial operations.

28. The method of claim 17, wherein the universal data model format supports a plurality of fields comprising balance update details and balance update count details.

29. The method of claim 17, wherein the universal data model format supports a plurality of fields comprising transaction specific metadata.

30. The method of claim 17, wherein the one or more filters is based at least in part on metadata.

31. The method of claim 17, wherein the interactive user interface displays transactions statistics and balance update details.

32. The method of claim 31, wherein the balance update details comprise date, block height and transaction hash.

* * * * *